United States Patent [19]

Makita

[11] Patent Number: 4,946,300
[45] Date of Patent: Aug. 7, 1990

[54] COMPACT ELECTRONIC APPARATUS
[75] Inventor: Sadao Makita, Tachikawa, Japan
[73] Assignee: Kabushiki Kaishi Toshiba, Kawasaki, Japan
[21] Appl. No.: 341,246
[22] Filed: Apr. 20, 1989

Related U.S. Application Data

[63] Continuation of Ser. No. 172,496, Mar. 24, 1988, abandoned.

[30] Foreign Application Priority Data

Mar. 24, 1987 [JP]  Japan .............................. 62-42008[U]

[51] Int. Cl.⁵ .............................................. B41J 11/56
[52] U.S. Cl. ..................................... 400/682; 400/680
[58] Field of Search .................. 400/83, 679, 680, 682

[56] References Cited

U.S. PATENT DOCUMENTS 3,902,034  8/1975  Isozaki .............. 400/682 x
4,483,572 11/1984  Story ................. 400/682 X
4,571,456  2/1986  Paulsen et al. ........ 179/2 C
4,851,812  7/1989  Holmberg ............. 400/680
4,859,092  8/1989  Makita ............... 400/83

FOREIGN PATENT DOCUMENTS 1082085 12/1954  France ................ 400/680
59-99111  6/1984  Japan .

OTHER PUBLICATIONS

IBM Tech. Disc. Bulletin, "Six-Point Hinge Mechanism", vol. 28, No. 6, Nov. 1985, pp. 2476–2477.
IBM Tech. Disc. Bulletin, "Lift Mechanism", vol. 29, No. 7, Dec. 1986, pp. 3012–3013.

Primary Examiner—Edgar S. Burr
Assistant Examiner—Ren Yan
Attorney, Agent, or Firm—Foley & Lardner, Schwartz, Jeffery, Schwaab, Mack, Blumenthal & Evans

[57] ABSTRACT

An electronic apparatus comprises a keyboard disposed in a front portion of the apparatus; a printing section disposed in a back portion of the apparatus and printing information inputted by the operation of the keyboard and capable or raising from an appratus body; a display section disposed between the keyboard and the printing section and displaying the information inputted by the operation of the keyboard, the display section being pivoted from the keyboard towards the printing section; the printing section being raised from the apparatus body in association with the pivotal movement of the display section; a link mechanism for moving the printing section from the storing position within the apparatus body, to a hop-up position in which the printer is located above the apparatus body; and a power transmitting mechanism for transmitting the pivotal movement of the display section to the link mechanism.

4 Claims, 3 Drawing Sheets

COMPACT ELECTRONIC APPARATUS

This application is a continuation of application Ser. No. 07/172,496, filed Mar. 24, 1988, now abandoned.

The present invention relates to a compact electronic apparatus such as a portable type computer.

BACKGROUND OF THE INVENTION

In a compact electronic apparatus such as a portable type computer, when a printing operation is performed by an output device, a display device is located in a stand-up state so as to operate a keyboard. However, in such a state, a plate for guiding printed paper is hidden by the display device, so that it is not easy to set the printed paper.

To solve this problem, when the height of the display device is reduced and the output device is located backwards, the guide plate is not hidden and easily seen. However, by this arrangement, the size of the display device is smaller and information displayed on the display device are reduced and the depth of the apparatus body is deeper, so that it is not easy to make the apparatus compact.

As mentioned above, in the conventional compact electronic apparatus such as a portable computer, when the apparatus is made compact, it is not easy to set the printed paper at the printing time.

SUMMARY OF THE INVENTION

To solve the problems mentioned above, an object of the present invention is to provide an electronic apparatus for facilitating the printing operation and making it easy to see a display device, and making the apparatus compact without reducing the sizes of the display device and the apparatus body.

With the above object in view, the present invention resides in an electronic apparatus comprising a keyboard and a printer disposed within an apparatus body; a display device pivoted through a rotary hinge member attached to the apparatus body, from a storing position for covering an operating surface of the keyboard to a setting position in which the display device is substantially perpendicular to the apparatus body, said display device being able to move further backwards from the setting position; a parallel link mechanism for moving the printer from a stored position within the apparatus body to a hop-up position located above the apparatus body; a power transmitting mechanism for transmitting the rotation of the rotary hinge member to the parallel link mechanism; a stopper for restricting the operation of the parallel link mechanism when the printer is moved to the hop-up position; and a shaft locking device for rotating the rotary hinge member to adjust the pivotal movement of the display device in a state in which a return-locking force is applied to the rotary hinge member when the operation of the parallel link mechanism is restricted by the stopper.

BRIEF DESCRIPTION OF THE DRAWINGS

The present invention will be more apparent from the following description of the preferred embodiments thereof in conjunction with the accompanying drawings in which.

DETAILED DESCRIPTION OF THE PREFERRED EMBODIMENTS

The preferred embodiments of an electronic apparatus of the present invention will now be described in detail with reference to the accompanying drawings.

Figure 1:
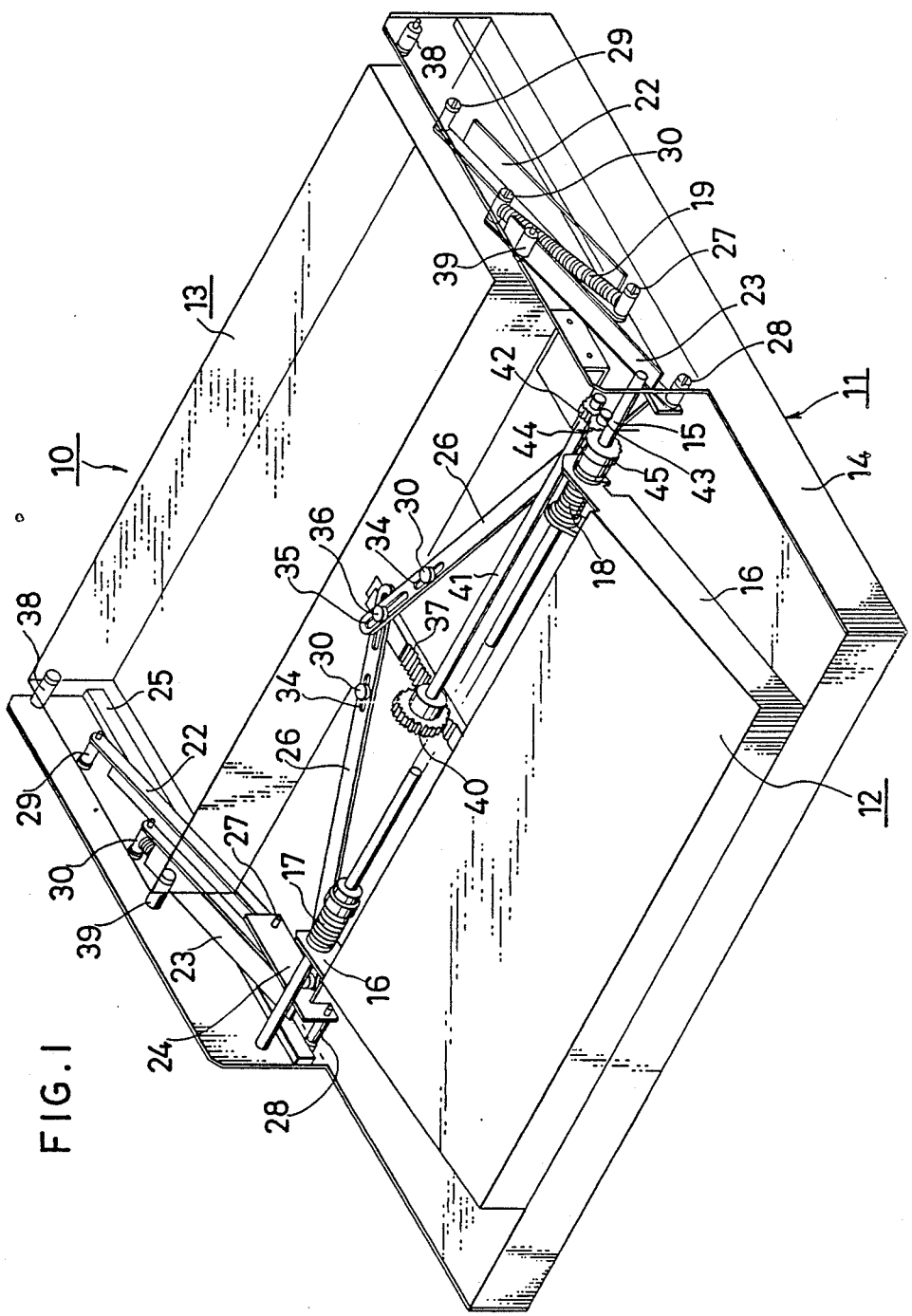
FIG. 1 is a perspective view showing main portions of a compact electronic apparatus in a stored state thereof in accordance with one embodiment of the present invention.
Figure 2:
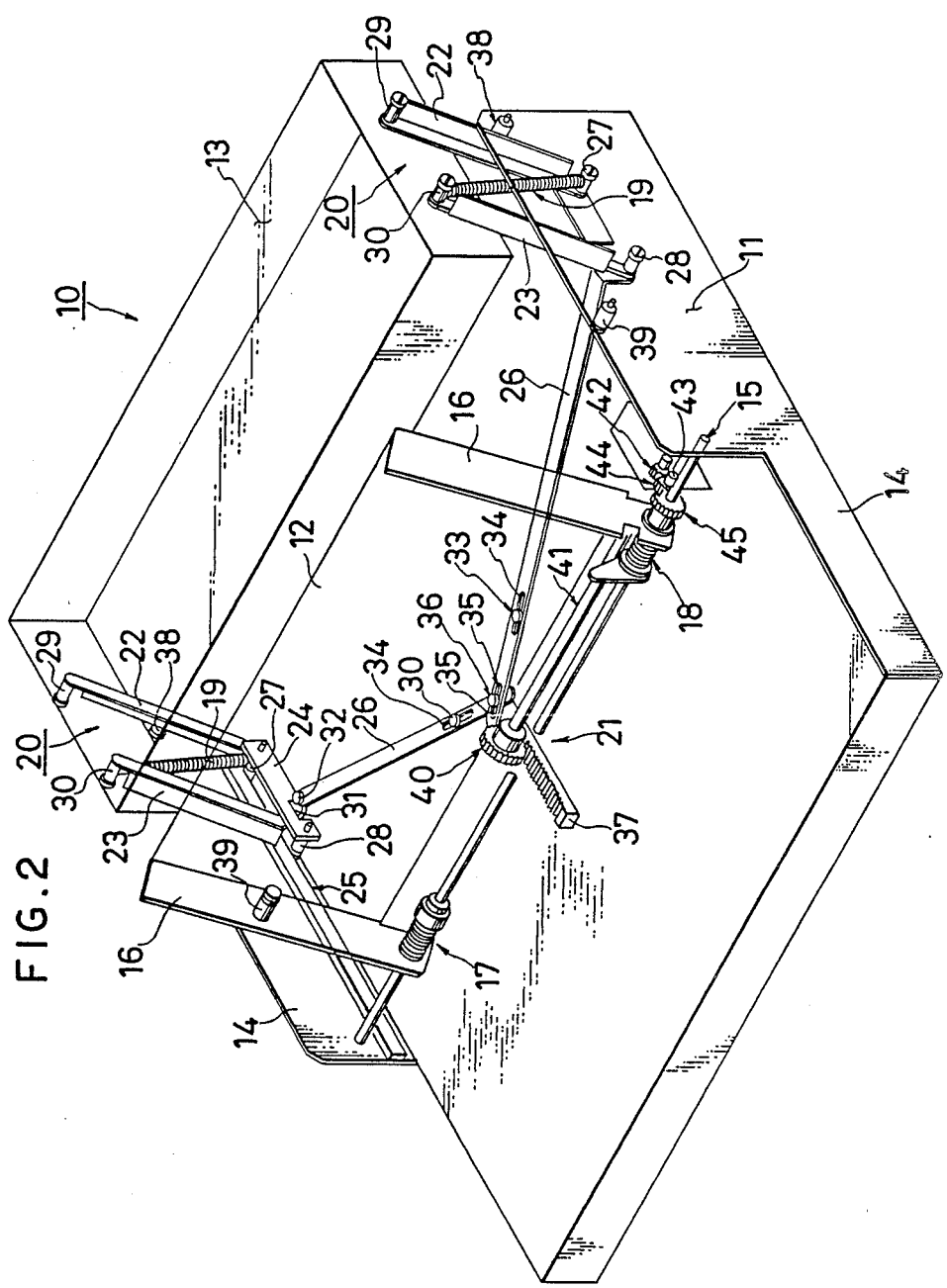
FIG. 2 is a perspective view showing the main portions of the compact electronic apparatus of FIG. 1 in a state in which the apparatus can be used.

In FIGS. 1 to 3, a compact electronic apparatus 10 is constituted by a portable computer as an example, and comprises, within an apparatus body 11, a display device 12, a printer 13 as an output device, and a keyboard as an input device, etc.

Figure 3A:
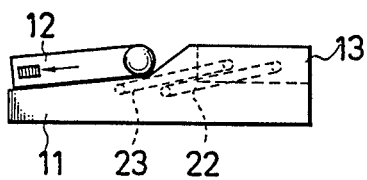
FIGS. 3A to 3G show schematic views for explaining the sequential operations of the apparatus of FIGS. 1 and 2.
Figure 3B:
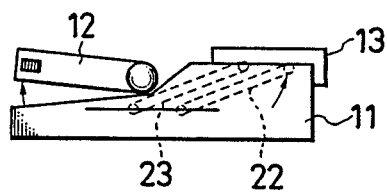
Figure 3C:
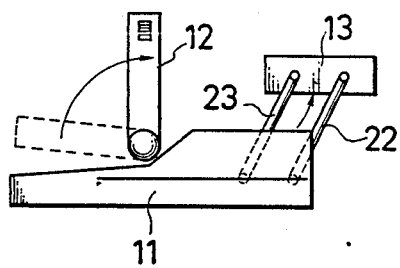
Figure 3D:
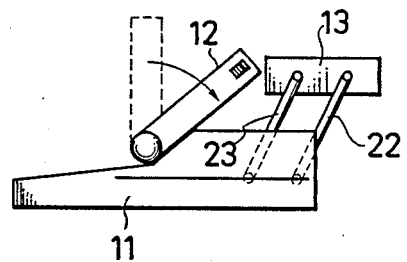
Figure 3E:
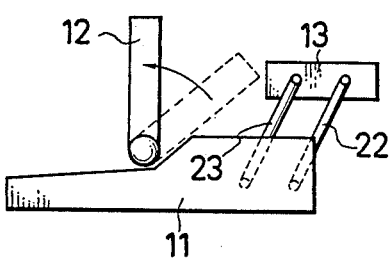

The display device 12 is fixedly supported by a pair of rotary hinge members 16 integrally rotated with a shaft 15 pivotally supported at both ends thereof by left and right side walls 14 of the apparatus body 11. The display device 12 can be pivoted from a stored position shown in FIGS. 1 and 3A in which an unillustrated keyboard is covered by the rotary hinge members 16 and the display device 12, through a setting position shown by FIG. 3C in which the display device 12 is substantially perpendicular to the apparatus body 11, and can be pivoted further backwards as shown in FIG. 3D.

A pair of shaft locking devices 17 and 18 are disposed between the rotary hinge members 16 and the shaft 15. The shaft locking devices 17 and 18 may be constituted by a known structure called "shaft locking apparatus" in which, when a stress is applied to a coil spring in the wound direction thereof, the diameter of the coil spring is reduced, and when the stress is applied to the coil spring in a direction opposite to the wound direction, the diameter of the coil spring is increased, thereby providing a load to the shaft 15. FIG. 3A shows a state in which the display device 12 is stored and latched in the apparatus body in the stored position When the latched state of the display device 12 shown in FIG. 3A is released, the shaft locking devices 17 and 18 slightly hop up the display device 12 to a state shown in FIG. 3B by a spring 19 in the expanded biasing force thereof described later. When the display device 12 is further pivoted, the shaft locking devices 17 and 18 apply a predetermined load to the display device 12 so that an operator can pivot and hold the display device 12 in an arbitrary position.

The printer 13 is attached to the apparatus body 11 through a parallel link mechanism 20 which is moved in association with the rotation of the rotary hinge members 16 through a power transmitting mechanism 21.

The parallel link mechanism 20 is approximately symmetrically disposed in right and left side walls 14 of the apparatus body 11, and is constituted by links 22, 23, 24, a link guide 25, a hop-up lever 26, etc. The links 22 and 23 are spaced apart from each other, and are pivotally attached at one ends thereof to the link 24 through guide pins 27 and 28. The other ends of the links 22 and 23 are pivotally attached onto a side of a printer 13 through pins 29 and 30 so that the links 22 and 23 are parallel to each other. A coil spring 19 is disposed between the pin 30 and the guide pin 27. The guide pins 27 and 28 are engaged with the guide rail 25 attached to a side wall 14 therealong such that the link 24 can move along the guide rail 25. The link 24 can move forwards and backwards by pivoting the hop-up lever 26 pivotally connected at one end thereof to an inside bent portion 31 through a pin 32. A fixed pin 33 is secured to the apparatus body 11, and is fitted into an elongated hole 34 of the hop-up lever 26 disposed in an intermediate portion thereof so that the hop-up lever 26 is pivoted around the fixed pin 33 as a fulcrum. A fixed pin 36 is disposed in a rack member 37 and is fitted into an elongated hole 35 of the hop-up lever 26 such that the other end of the hop-up lever 26 is pivotally connected to the rack member 37.

Figure 3F:
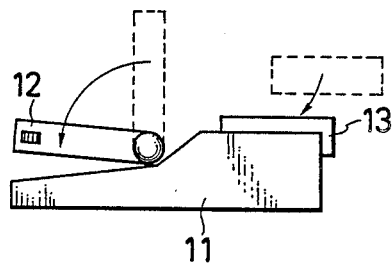
Figure 3G:
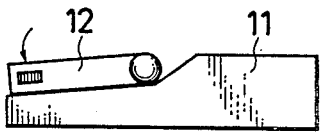

As shown in FIG. 1, when the rack member 37 is moved backwards, the link 24 is moved forwards, and the links 22 and 23 are biased by the expanding force of the spring 19 and are inclined backwards together so that the printer 13 is lowered and stored as shown in FIGS. 3A and 3G. On the other hand, when the rack member 37 is moved forwards, the link 24 is moved backwards as shown in FIG. 2, the links 22 and 23 are pivoted around pins 27 and 28 in the counterclockwise direction by the expanding biasing force of the spring 19 so that the printer 13 is moved upwards, resulting in a hop-up state thereof as shown in FIGS. 3C and 3D. When the printer 13 is raised and has become in the hop-up state, the link 22 and the hop-up lever 26 contact stoppers 38 and 39 respectively to prevent the links 22 and 23 and the hop-up lever 26 from being further rotated and displaced.

The power transmitting mechanism 21 comprises a gear 41 engaged with the rack member 37, a rotary shaft 41, a gear 42, and rotary shafts 43, 44 and 45. The gears 40 and 42 are respectively fixed to both ends of the rotary shaft 41, and the gear 44 is pivotally supported by the rotary shaft 43 in a state in which the gear 44 is engaged with the gears 42 and 45. Accordingly, in the power transmitting mechanism 21, when the shaft 15 is rotated by the rotation of rotary hinge members 16, the rotation of the shaft 15 is transmitted to the gear 40 though the gears 45, 44, 42 and the rotary shaft 41, and is further converted to a linear movement of the hop-up lever 26 by the gear 40 and rack member 37.

In the compact electronic apparatus constituted above, when the apparatus is not used, the keyboard is covered by the display device 12 in a latching state thereof. In this state, the rack member 37 has been moved backwards, and the link 24 has been moved forwards so that the parallel links 22 and 23 have been inclined backwards by the biasing expanding force of the spring 19, and the printer 13 has been stored within the apparatus body 11 as shown in FIGS. 1 and 3A. When the latching state of the apparatus is released, the biasing force of the spring 19 is stronger than a braking force of the shaft locking devices 17 and 18 so that the parallel links 22 and 23 are slightly raised. The raising movement of the parallel links 22 and 23 is transmitted to the rotary hinge members 16 through the hop-up lever 26 and the power transmitting mechanism 21 so that the display device 12 and the printer 13 are slightly hopped up as shown in FIG. 3B. When the display device 12 is further pivoted upwards from this state, the shaft 15 is rotated by the rotation of the rotary hinge member 16 through the shaft locking devices 17 and 18. The rotation of the shaft 15 is transmitted to the link 24 through the power transmitting mechanism 21 so that the link 24 is moved backwards in association with the rotation of rotary hinge members 16. When the display device 12 is located in a setting state in which the display device 12 is approximately perpendicular to the apparatus body 11, the printer 13 is completely hopped up as shown in FIG. 3C. In this hop-up state, a display surface of the display device 12 is not easily seen since the display device 12 is substantially in the perpendicular state. Accordingly, the display device 12 is further inclined backwards from the perpendicular state as shown in FIGS. 2 and 3D. The parallel link mechanism 20 contacts the stoppers 38 and 39 at this time so that the printer 13 keeps the state thereof as it is, and only the display device 12 is inclined backwards by a return-locking action due to a frictional force generated by the shaft locking devices 17 and 18 so that the angle of the display device 12 can be adjusted to an arbitrary position. When the display device 12 is inclined backwards towards the maximum position thereof as shown in FIGS. 2 and 3D, the height of a top portion of the display device 12 becomes approximately equal to that of an operating surface of the printer 13. Accordingly, when the apparatus is used in this state, an operator can look at the display device 12 and the operating surface of the printer 13 simultaneously so that the printer 13 is easily operated. Next, when the apparatus has been used and is stored, the display device 12 is inclined forwards, only the display device 12 is pivoted during the time when the display device 12 returns to the setting position of FIG. 3E. When the display device 12 has pivoted to the setting position thereof, the rotation of the rotary hinge member 16 is transmitted to the shaft 15 through the shaft locking devices 17 and 18, thereby rotating the shaft 15 reversely. The link 24 is moved forwards by the reverse rotation of the shaft 15, so that the printer 13 is lowered and the display device 12 and the printer 13 are slightly hopped up as shown in FIG. 3F. When the display device 12 is further rotated, the display device 12 covers the keyboard and is stored within the apparatus body, thereby completely storing the printer 13 within the apparatus body 11. When the display device 12 is latched in this state, the display device 12 can be stored compactly as shown in FIG. 3G. In this construction, the display device 12 can be stopped in an arbitrary position by the shaft locking devices 17 and 18 except for a state from the slightly hop-up state of the display device 12 and the printer 13 shown in FIGS. 3B and 3F to the stored state thereof.

In the embodiment mentioned above, a portable type computer is described in detail as an example of a compact electronic apparatus, but the present invention can be not only applied to the computer, but also to various kinds of compact electronic apparatuses such as word processors.

In a compact electronic apparatus of the present invention mentioned above, a display device is hopped up while the display device is pivoted from a stored position to a setting position, and an operating surface of a printer is located above the display device to be easily seen at the printing time so that it is easy to perform the printing operation of the printer and the size of the apparatus is not large and made compact. Further, the apparatus is improved in operability and is made compact without especially reducing the size of the display device so that the display device can be easily seen.

What is claimed is:
1. A portable apparatus, comprising:
   a main body including a keyboard at the front thereof, a printer portion at the rear thereof, and a hinge portion between the keyboard and the printer portions;
   a display unit, including a display surface, a top portion and a bottom portion, said display unit being pivotally connected to the hinge portion of the main body, the display unit being rotatable between a closed position at which the display unit covers the keyboard on the main body and an open position at which the display unit is raised and the keyboard is uncovered and available for operation;

a printer, mounted on the printer portion of the main body when the display unit is in the closed position, said printer including an upper operation surface; and means for automatically lifting the upper operation surface of the printer to a height which is approximately equal to the height of the top portion of the display unit when the display unit is in the open position to enable the user to observe the printer during operation of the apparatus.

2. The portable apparatus according to claim 1, wherein the lifting means includes means responsive to the rotation of said display unit to said open position, for lifting the printer from the printer portion of the main body to the height of the top portion of the display unit when the display unit is rotated from its closed position to its open position.

3. A portable apparatus, comprising:
a main body, including a keyboard on the front of the main body, a printer portion on the rear of the main body, a hinge portion between the keyboard and the printer portion, and a pair of link portions;

a display unit, including a display surface, a top portion and a bottom portion, said display unit being pivotally connected to the hinge portion of the main body, the display unit being rotatable between a closed position at which the display unit covers the keyboard on the main body and an open position at which the keyboard is uncovered and available for operation;

a printer, mounted on the printer portion of the main body when the display unit is in the closed position, said printer including an upper operation surface;

a pair of links, each link having a length approximately equal to a length between the top and bottom portions of the display unit, each link including a first end portion pivotally connected to the main body and a second end portion connected to the printer; and means for automatically rotating the pair of links when the display unit is moved to the open position, such that the upper operation surface of the printer is at a height which is approximately equal to the height of the top portion of the display unit to enable the user to observe the printer during operation of the apparatus.

4. The portable apparatus according to the claim 3, wherein said automatic rotating means includes means for connecting the rotational movement of the display unit with the rotational movement of the pair of links.

* * * * *